(12) United States Patent
Humphrey et al.

(10) Patent No.: US 8,276,000 B2
(45) Date of Patent: Sep. 25, 2012

(54) SYSTEM AND METHOD FOR SUPPLYING POWER TO A LOAD USING DEEP-SLEEP-MODE POWER SUPPLIES

(75) Inventors: Daniel Humphrey, Houston, TX (US); Mohamed Amin Bemat, Cypress, TX (US); Zachary J. Gerbozy, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 12/607,848

(22) Filed: Oct. 28, 2009

(65) Prior Publication Data

US 2011/0095607 A1 Apr. 28, 2011

(51) Int. Cl.
*G06F 1/26* (2006.01)
*G06F 1/18* (2006.01)
*G06F 1/28* (2006.01)
*G06F 1/30* (2006.01)
*G06F 1/32* (2006.01)

(52) U.S. Cl. ........ 713/300; 713/310; 713/320; 713/323; 713/324; 713/340; 307/18; 307/43; 307/58; 307/82

(58) Field of Classification Search .................. 713/300, 713/310, 320–324, 330, 340; 307/11, 18, 307/31–32, 43, 58, 82
See application file for complete search history.

(56) References Cited

U.S. PATENT DOCUMENTS

| | | | |
|---|---|---|---|
| 6,735,704 B1* | 5/2004 | Butka et al. | 713/300 |
| 2010/0058083 A1* | 3/2010 | Rangeley | 713/320 |
| 2010/0264741 A1* | 10/2010 | Togare | 307/80 |
| 2011/0057724 A1* | 3/2011 | Pabon | 327/581 |

* cited by examiner

*Primary Examiner* — Fahmida Rahman
(74) *Attorney, Agent, or Firm* — Kevin M. Hart; Angela Mae Coxe

(57) ABSTRACT

A system and method are provided for supplying power to a load using deep-sleep-mode power supplies. Each of plural switching power supplies includes an input converter, an output converter and a standby converter. Each is configured to have its output converter connected to the load, and each is configured to operate in at least an online mode in which the input, output and standby converters are enabled for switching, and a deep sleep mode in which the input, output and standby converters are disabled from switching. A system controller is configured to place a first set of the plural switching power supplies in the online mode and a second set of the plural switching power supplies in the deep sleep mode while the load is operating and the power supplies in the first set are supplying power to the load.

17 Claims, 4 Drawing Sheets

SYSTEM AND METHOD FOR SUPPLYING POWER TO A LOAD USING DEEP-SLEEP-MODE POWER SUPPLIES

BACKGROUND

Prior art switching power supplies for electronic systems have included an input converter, at least one output converter and a standby converter. The input converter converts an input alternating current ("AC") voltage to a relatively high direct current ("DC") voltage suitable for consumption by the output converters and by the standby converter. Thus the input converter is an AC-DC converter. The input converter usually includes power factor correction circuitry. The output converters convert the high-voltage DC level generated by the input converter into lower-level DC voltages suitable for consumption by the electronic system load. For example, if the load is a server computer, the lower-level DC voltages needed from the output converters are typically on the order of 12VDC, 5VDC or lower. The output converters are DC-DC converters. The standby converter is also a DC-DC converter in that it converts the high-voltage DC level from the input converter into a lower DC voltage level, but the standby converter is configured to supply less demanding loads than are the output converters. The output of the standby converter may be used, for example, to power wake-on-LAN or similar circuitry that must remain active in a server computer when the remainder of the server computer's systems are powered off.

Prior art switching power supplies such as those just described have been capable of operating in only two modes: an online mode and a standby mode. When a prior art power supply operates in its online mode, all of the converters in the power supply are actively switching and the power supply is capable of sourcing full operating current to a load such as a server computer that is fully powered on and operational. When a prior art power supply operates in its standby mode, its output converters are not switching, but its input converter and its standby converter are still both actively switching. The latter mode may be used, for example, when the load itself is in a standby mode requiring only a fraction of the load's full operating power. In such a circumstance, the standby converter in the power supply is capable of sourcing the smaller power demanded by the load without any contribution from the output converters.

Thus, in prior art switching power supplies, the input converter and the standby converter both remain actively switching regardless of whether the power supply is operating in its online mode or in its standby mode.

DETAILED DESCRIPTION

Figure 1:
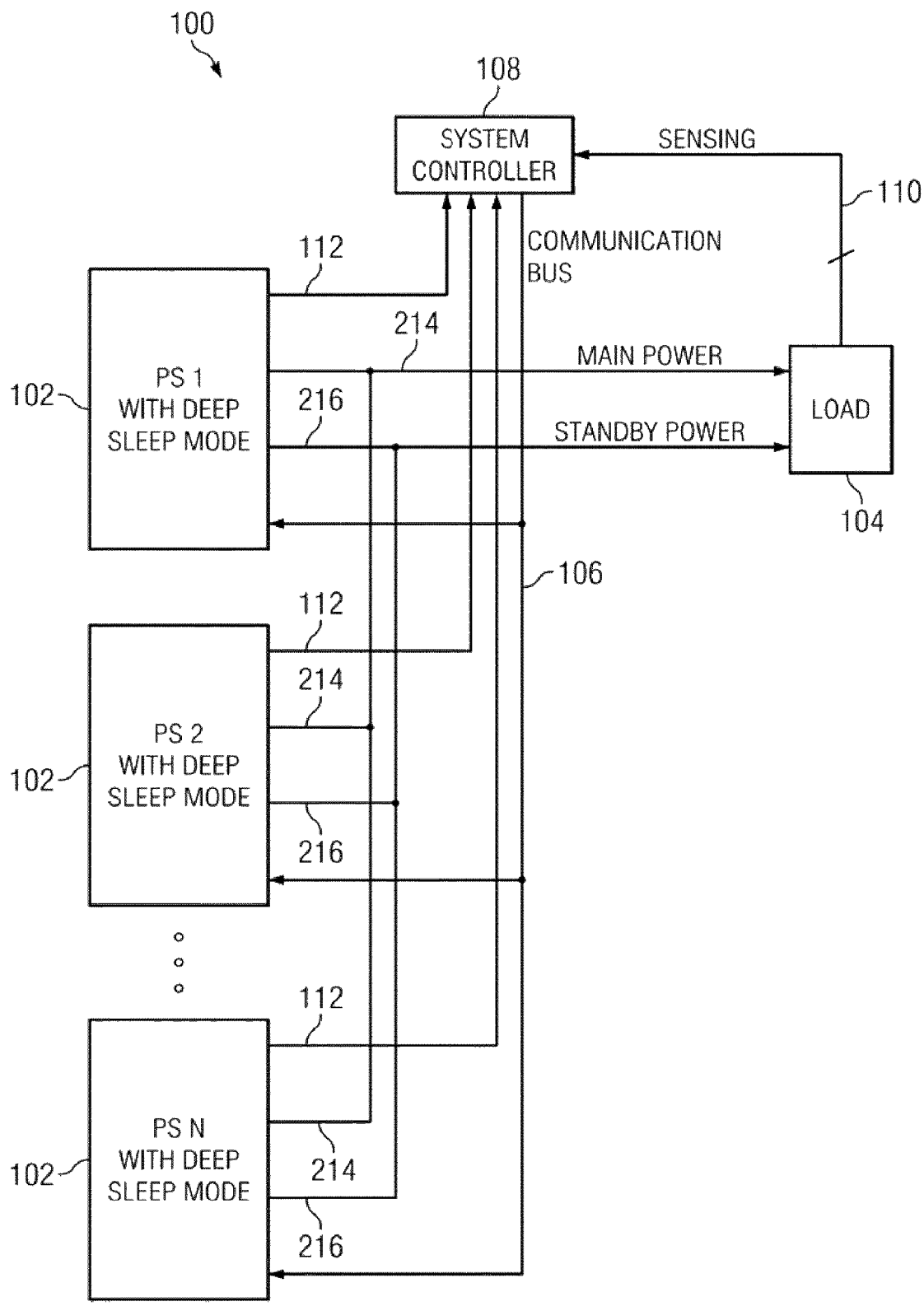
FIG. 1 is a block diagram illustrating a system according to an embodiment of the invention for supplying power to a load using deep-sleep-mode power supplies.
Figure 2:
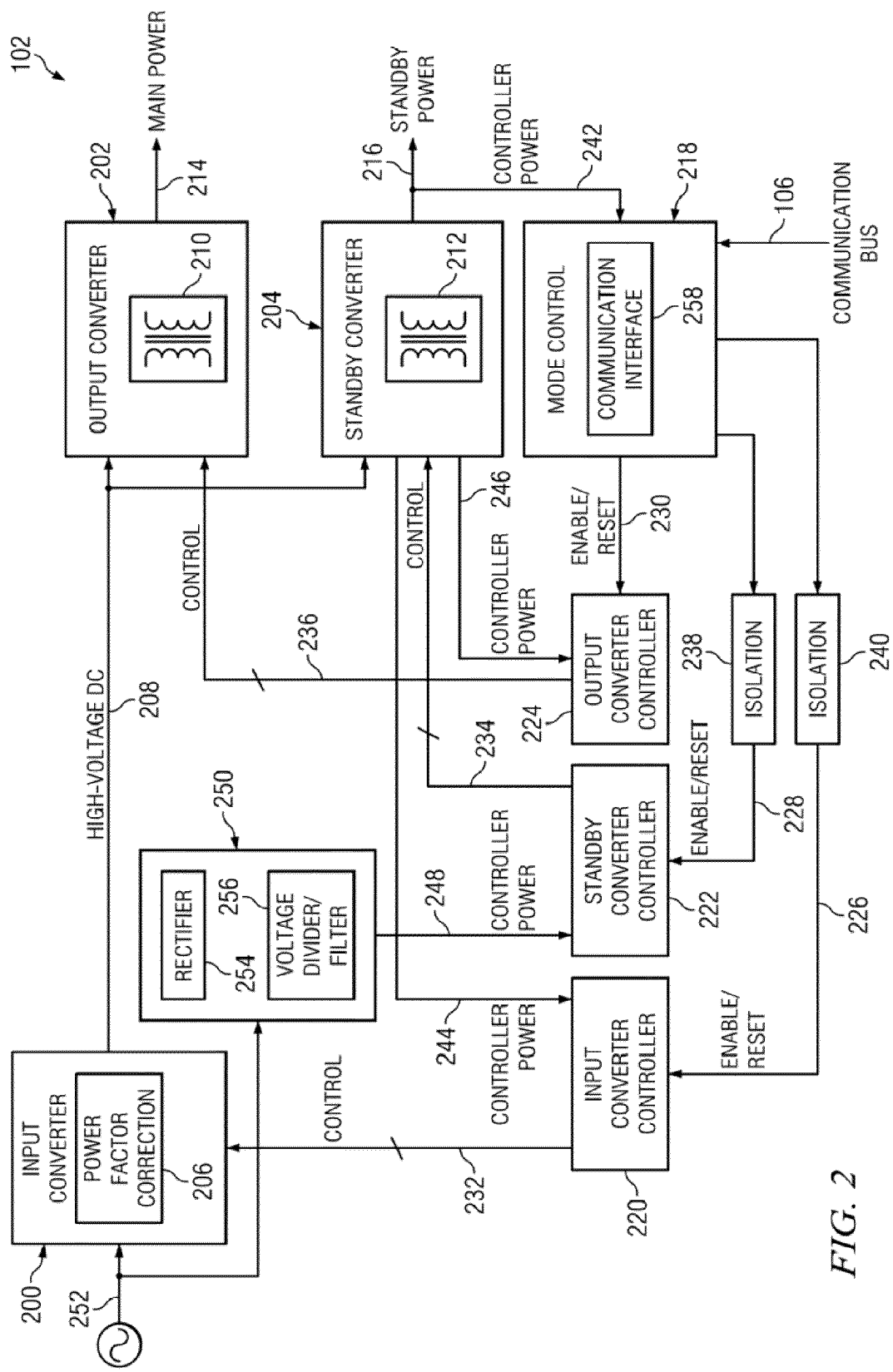
FIG. 2 is a block diagram illustrating one of the deep-sleep-mode power supplies of FIG. 1 in greater detail.

FIG. 1 illustrates a system 100 according to an embodiment of the invention for supplying power to a load using deep-sleep-mode power supplies. Plural switching power supplies 102 are provided. Each of power supplies 102 may be configured, for example, as shown in FIG. 2. Each power supply 102 includes at least an input converter 200, an output converter 202 and a standby converter 204. Converters 200, 202, 204 may be conventional. Input converter may include power factor correction circuitry 206 such as a switching boost converter or other type of power factor correcting converter. Input converter 200 produces a high-voltage DC output 208, which supplies output converter 202 and standby converter 204. Both of output converter 202 and standby converter 204 will typically include switching circuitry and a transformer 210, 212. A switched version of DC level 208 is applied to the transformer primary and is converted into a suitable AC voltage at the transformer secondary. The AC voltage at the transformer secondary is then rectified and made available at an output 214, 216.

Power supplies 102 may also include mode control circuitry 218 for changing the mode of the power supply. Mode control may be accomplished, for example, by toggling either an enable or a reset input on a converter controller. Specifically, an input converter controller 220 may be provided for controlling the activity of input converter 200; a standby converter controller 222 may be provided for controlling the activity of standby converter 204; and an output converter controller 224 may be provided for controlling the activity of output converter 202. Each of controllers 220, 222, 224 may have an enable input or a reset input 226, 228, 230, respectively. When the controller is enabled or does not have its reset input asserted, it applies appropriate signaling over control lines 232, 234, 236, causing the respective converter to actively switch. Conversely, when the controller is disabled or has its reset input asserted, it disables switching activity in the respective converter.

A variety of implementation styles are available. In some embodiments, each of controllers 220, 222, 224 may be discrete systems. In other embodiments, some or all of the functionality of controllers 220, 222, 224 may be integrated into a single component.

In exemplary embodiments, typically mode control circuitry 218 will be electrically disposed on the secondary side of transformers 210, 212. In such embodiments, isolation elements 238, 240 may be used to electrically isolate the control signals generated by mode control circuitry 218 from the enable/reset inputs of controllers that are electrically disposed on the primary side of transformers 210, 212, as are controllers 220, 222 in the illustrated embodiment. For example, optical isolators or magnetic isolators may be used. In the illustrated embodiment, isolation elements need not be used for secondary-side controllers such as output converter controller 224.

In the embodiment illustrated, mode control circuitry 218 is designed to operate on the same voltage level that is generated at standby power output 216. Indeed, mode control circuitry takes its controller power directly from standby power output 216 as indicated at 242. Input converter controller 220 may take its controller power from a bias voltage generated by a winding on the primary side of transformer 212, as indicated at 244. Output converter controller may take its controller power from a bias voltage generated by a winding on the secondary side of transformer 212 as indicated at 246. Other biasing arrangements are possible on other implementations. Typically, standby converter controller 222 will take its controller power 248 from a simple converter 250 that is connected directly to AC mains input 252. Converter 250 may be as simple as a rectifier 254 and voltage divider/filter 256 or may be more elaborate. In other embodiments, standby converter controller 222 may be powered by other means.

Figure 3:
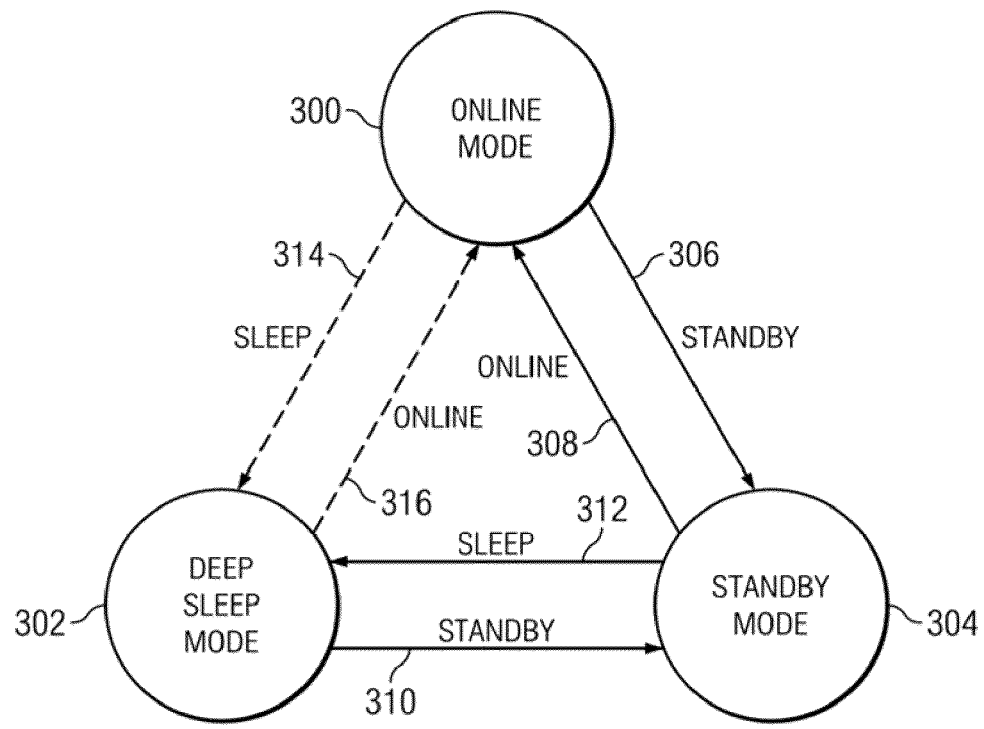
FIG. 3 is a state diagram illustrating an example behavior for the mode control circuitry of FIG. 2.

FIG. 3 presents an example behavioral description for mode control circuitry 218. In online mode 300, mode control circuitry 218 enables all three converter controllers 220, 222 and 224, thus enabling input converter 200, standby converter 204 and output converter 202 for switching. In deep sleep mode 302, mode control circuitry 218 disables or resets all three converter controllers 220, 222 and 224, thus disabling input converter 200, standby converter 204 and output converter 202 from switching. In standby mode 304, mode control circuitry enables converter controllers 220 and 222 but disables or resets converter controller 224. Thus in the standby mode, only input converter 200 and standby converter 204 are enabled for switching; output converter 202 is disabled from switching. The transitions between states 300, 302 and 304 will be described in further detail below.

Mode control circuitry 218 includes a communication interface 258. Interface 258 is coupled to a communication bus 106, which in turn is coupled to a system controller 108. System controller 108 is capable of determining a per-power supply load during operation, such as by means of sensing signals 110. System controller 108 is also able to determine whether any of power supplies 102 has failed, such as by means of power good signals 112. Power good signals 112 may be generated within each of power supplies 102 by conventional means. Communication bus 106 can take a variety of forms. In the illustrated embodiment, communication bus 106 is a serial bus, so that pin counts on each power supply may be reduced. In other embodiments, it may comprise independent signals to and from each individual power supply, or it may take the form of a parallel bus, daisy chain or other topology.

System controller 108 is able to individually set the mode in which each of power supplies 102 operates by sending appropriate commands or control signals over communication bus 106. To cause a power supply 102 to transition between online mode 300 and standby mode 304, system controller 108 can send a standby command or an online command to that power supply as appropriate and as indicated in FIG. 3 at 306, 308. To cause a power supply 102 to transition between standby mode 304 and deep sleep mode 302, system controller 108 can send the power supply a standby command or a sleep command as indicated at 310, 312. In one class of embodiments, each power supplies 102 may be designed to transition back and forth between deep sleep mode 302 and online mode 300 only by passing through standby mode 304. In another class of embodiments, power supplies 102 may be designed to be capable of direct transition between deep sleep mode 302 and online mode 300. In the latter embodiments, system controller 108 can effect the direct transition by sending sleep or online commands to an individual power supply as indicated at 314, 316.

Figure 4:
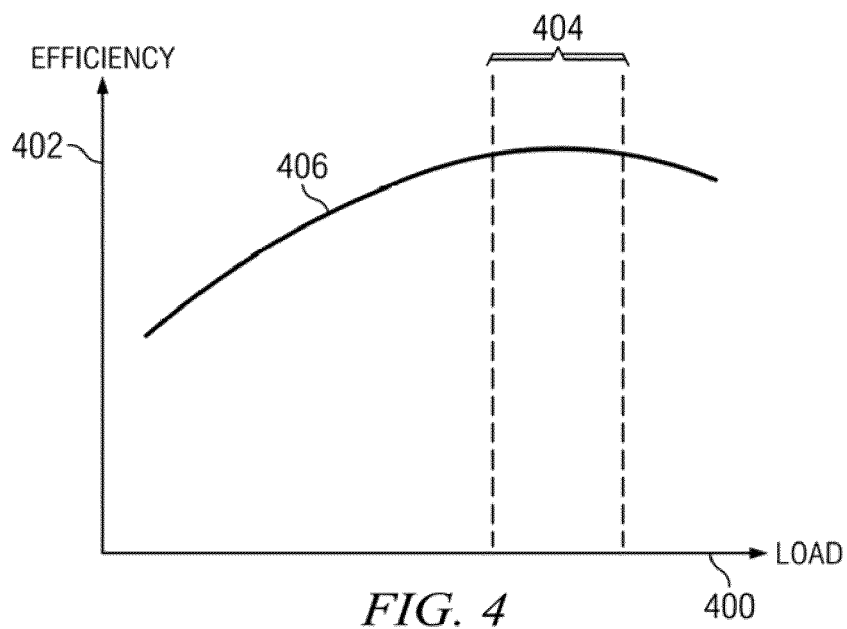
FIG. 4 is a graph illustrating an example efficiency curve for one of the deep-sleep-mode power supplies of FIG. 1.

A typical power supply 102 will have an efficiency curve resembling the one drawn in FIG. 4. Per-power-supply load 400 is drawn on the bottom axis. Power supply efficiency 402 is drawn on the vertical axis. A maximum efficiency operating range for the power supply is indicated at 404. As curve 406 illustrates, when the per-power-supply load is low, the power supply may be operating below maximum efficiency range 404 for the power supply. Conversely, when the per-power-supply load is high, the power supply may be operating above maximum efficiency range 404. It is optimal for each power supply in system 100 to operate, if at all, in its maximum efficiency range 404.

Figure 5:
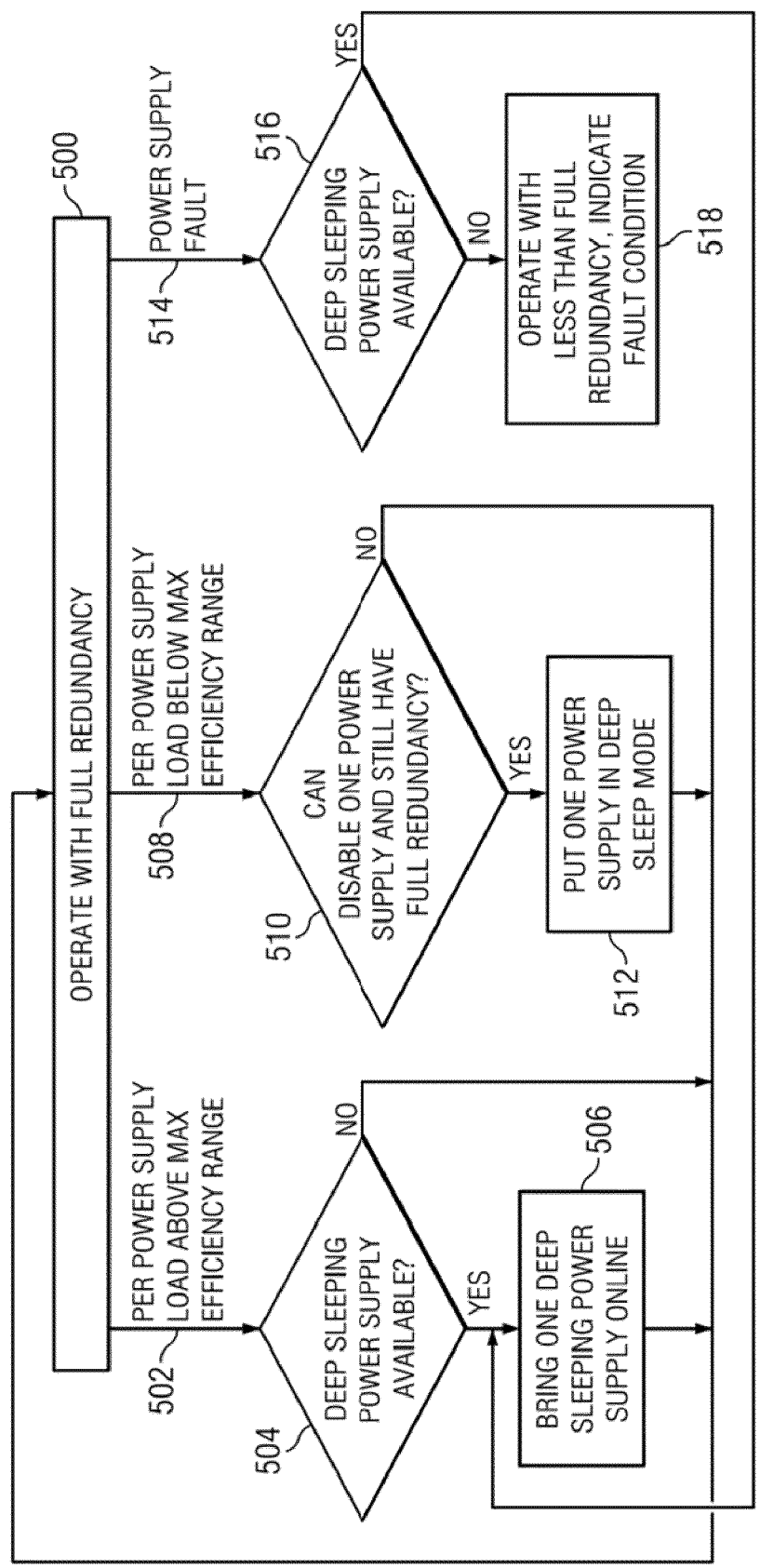
FIG. 5 is a flow diagram illustrating an example behavior for the system controller of FIG. 1.

In order to accomplish or at least approach the optimal behavior, system controller 108 may be designed to behave as indicated in FIG. 5. An objective may be to operate normally in full redundancy state 500. In state 500, while load 104 is online and operating, a first set of power supplies 102 is in online mode 300 while simultaneously a second set of power supplies 102 is in deep sleep mode 302. In an N+1 arrangement, full redundancy state 500 may mean that the number of power supplies in the first set is sufficiently large that, should one of them fail, the aggregate power capacity of the power supplies remaining operational in the first set would still be greater than or equal to the online power requirement of load 104. In an N+N arrangement wherein half of the power supplies take power from one AC input and half take power from another AC input, full redundancy state 500 may mean that one of the AC inputs could fail (or equivalently all of the power supplies associated with one AC input could fail), and the aggregate power capacity of the power supplies remaining operational in the first set would still be greater than or equal to the online power requirement of load 104.

If system controller 108 determines that the per-power-supply load in system 100 is above maximum efficiency range 404, and if at least one deep-sleep-mode power supply is available in the second set, then system controller 108 may move one of the power supplies from the second set to the first set by placing the power supply into online mode 300 as indicated at 502, 504, 506. Doing so will lower the per-power-supply load in the system, causing the operating point along curve 406 to move to the left, in the direction of maximum efficiency range 404. The transition from deep sleep mode 302 to online mode 300 may be made directly or by passing through standby mode 304.

If, on the other hand, system controller 108 determines that the per-power-supply load in system 100 is below maximum efficiency range 404, and at least one of the power supplies in the first set can be disabled while still preserving full redundancy, then system controller 108 may move one of the power supplies from the first set to the second set by placing the power supply into deep sleep mode 302 as indicated at 508, 510, 512. Doing so will raise the per-power-supply load in the system, causing the operating point along curve 406 to move to the right, once again in the direction of maximum efficiency range 404. The transition from online mode 300 to deep sleep mode 302 may be made directly or by passing through standby mode 304.

If system controller 108 determines that one of the power supplies in the first set has failed, and if at least one deep-sleep-mode power supply is available in the second set, then system controller 108 may move one of the power supplies from the second to the first set by placing it in online mode 300 as indicated at 514, 516, 506, thus preserving full redundancy. The transition from deep sleep mode 302 to online mode 300 may be made directly or by passing through standby mode 304. If a deep sleep mode power supply is not available to replace the one that has failed, then system controller may continue to operate system 100 with less than full redundancy as indicated at 518. In the latter state, system controller 108 may indicate the fault condition so that a repair of the system may be made.

In system 100, each of the main power outputs 214 of output converters 202 may be connected in parallel to load 104. Likewise, each of the standby power outputs 216 of standby converters 204 may be connected in parallel to load 104. In this manner, not only is redundancy achieved for powering load 104, but also the standby converters 204 of the power supplies in the first set described above will provide power to the mode control circuitry 218 of those power supplies that are in the second set described above. The result is that those power supplies in deep sleep mode 302 will consume an extremely small amount of power, and yet will still be able to respond to a mode change command by virtue of the fact that the mode control circuitry in the deep sleeping power supply still has power.

In one class of embodiments, system controller 108 may be implemented as a discrete component of system 100 as illustrated. In other embodiments, system controller 108 may be implemented differently. For example, it is possible to design system 100 so that the functionality of system controller 108 is provided by load 104 itself. If load 104 is a computer system, for instance, then the computer system may include a subsystem for implementing the functionality of controller 108 or may be programmed to provide that functionality.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

In the appended claims and in the foregoing written description, the words "comprising" and "comprises" are to be read in the open sense to mean "including the following elements but not excluding others."

What is claimed is:

1. A system, comprising:
    plural power supplies, each including an input converter, an output converter and a standby converter, each configured to have its output converter connected to a load, and each configured to operate in at least an online mode in which the input, output and standby converters are enabled for switching, and a deep sleep mode in which the input, output and standby converters are disabled from switching; and
    a system controller configured to place a first set of the plural power supplies in the online mode and a second set of the plural power supplies in the deep sleep mode while the load is operating and the power supplies in the first set are supplying power to the load;
    a mode control circuitry in each of the power supplies for changing the mode of the power supplies from the online mode to the deep sleep mode and vice versa; wherein:
    standby power outputs of all of the standby converters are connected together;
    the standby power outputs of the plural power supplies in the first set provide power to the mode control circuitry in each of the plural power supplies in the second set; and
    each of the plural power supplies is configured to transition back and forth between the deep sleep mode and the online mode by passing through a standby mode in which the standby converters of the power supplies are enabled for switching but the input and output converters of the power supplies are disabled from switching.

2. The system of claim 1, wherein:
    the number of power supplies in the first set is sufficiently large for fully redundant operation such that, if one of the power supplies in the first set fails, an aggregate power capacity of the remaining power supplies in the first set is greater than or equal to a power requirement of the load.

3. The system of claim 2, wherein:
    when a per power supply load among the power supplies in the first set is below a maximum efficiency range and at least one power supply can be removed from the first set without losing fully redundant operation, the system controller is configured to move at least one of the power supplies from the first set to the second set by placing the at least one of the power supplies into the deep sleep mode.

4. The system of claim 2, wherein:
    when a power supply in the first set fails and the second set contains at least one power supply, the system controller is configured to move the at least one power supply from the second set to the first set by placing the at least one power supply into the online mode.

5. The system of claim 2, wherein:
    when a per power supply load among the power supplies in the first set is above a maximum efficiency range and the second set contains at least one power supply, the system controller is configured to move the at least one power supply from the second set to the first set by placing the at least one power supply into the online mode.

6. The system of claim 1, wherein:
    each of the power supplies is configured to transition back and forth between the deep sleep mode and the online mode directly.

7. The system of claim 1, further comprising:
    a communication bus connecting the system controller with each of the plural power supplies and configured to allow the system controller to command each of the power supplies to enter either the online or the deep sleep mode.

8. The system of claim 7, wherein:
    the communication bus is a serial communication bus.

9. The system of claim 1, wherein:
    the system controller is implemented as a discrete component.

10. The system of claim 1, wherein: the system controller's functionality is provided by the load.

11. The system of claim 1, wherein:
    the mode control circuitry achieves mode control by toggling at least one enable or reset signal connected to a converter controller.

12. The system of claim 11:
    further comprising an input converter controller, an output converter controller and a standby converter controller; wherein:
    the input converter controller and the output converter controller are powered by at least one of a primary and a secondary bias output of the standby converters; and
    the standby converter controller is powered by a rectified DC voltage that is generated directly from an AC mains input to the power supplies.

13. A method of supplying power to a load, comprising:
    providing plural power supplies, each having an input converter, an output converter and a standby converter, and each capable of operating in an online mode in which the input, output and standby converters are all enabled for switching, and a deep sleep mode in which the input, output and standby converters are all disabled from switching, and each comprising mode control circuitry configured to change the mode of the power supplies;
    providing operating power to the load from the output converters of a first set of the power supplies that are in the online mode;
    keeping a second set of the power supplies in the deep sleep mode;
    providing power to the mode control circuitry of each of the power supplies in the second set from the standby converters of the first set of power supplies, wherein standby power outputs of all of the standby converters are connected together; and changing the mode of the power supplies from the online mode to the deep sleep mode and vice versa, such that each of the power supplies is configured to transition back and forth between the deep sleep mode and the online mode by passing through a standby mode in which the standby converters of the power supplies are enabled for switching but the input and output converters of the power supplies are disabled from switching.

14. The method of claim 13, further comprising:

moving at least one of the power supplies from the first set to the second set by placing the at least one of the power supplies into the deep sleep mode when a per power supply load among the power supplies in the first set is below a maximum efficiency range.

15. The method of claim 13, further comprising:

moving at least one power supply from the second set to the first set by placing the at least one power supply into the online mode after one of the power supplies in the first set fails.

16. The method of claim 13, further comprising:

moving at least one power supply from the second set to the first set by placing the at least one power supply into the online mode when a per power supply load among the power supplies in the first set is above a maximum efficiency range.

17. A system, comprising:

plural power supplies, each having an input converter, an output converter and a standby converter, and each capable of operating in an online mode in which the input, output and standby converters are all enabled for switching, and a deep sleep mode in which the input, output and standby converters are all disabled from switching;

a system controller to place a first set of the plural power supplies in the online mode such that its output converters of the first set supply power to the load, and a second set of the plural power supplies in the deep sleep mode while the load is operating and the power supplies in the first set are supplying power to the load;

mode control circuitry in each of the plural power supplies for changing the mode of the power supplies responsive to a communication in a communication bus; wherein:

standby power outputs of all of the standby converters are connected together;

the standby power outputs of the power supplies in the first set provide power to the mode control circuitry of each of the power supplies in the second set; and the mode control circuitry achieves mode control by toggling at least one enable or reset signal connected to a converter controller; and an input converter controller, an output converter controller and a standby converter controller; wherein:

the input converter controller and the output converter controller are powered by at least one of a primary and a secondary bias output of the standby converter; and the standby converter controller is powered by a rectified DC voltage that is generated directly from an AC mains input to the power supplies.

* * * * *

UNITED STATES PATENT AND TRADEMARK OFFICE
CERTIFICATE OF CORRECTION

PATENT NO. : 8,276,000 B2  
APPLICATION NO. : 12/607848  
DATED : September 25, 2012  
INVENTOR(S) : Daniel Humphrey et al.

Page 1 of 1

It is certified that error appears in the above-identified patent and that said Letters Patent is hereby corrected as shown below:

In the Claims:

In column 8, line 6, in Claim 17, after "that" delete "its".

Signed and Sealed this
Thirtieth Day of April, 2013

Teresa Stanek Rea
*Acting Director of the United States Patent and Trademark Office*